(12) United States Patent
Rullan et al.

(10) Patent No.: US 11,769,002 B2
(45) Date of Patent: Sep. 26, 2023

(54) EXTENDED DATA GRID COMPONENTS WITH MULTI-LEVEL NAVIGATION

(71) Applicant: Oracle International Corporation, Redwood Shores, CA (US)

(72) Inventors: Chris Rullan, Cambridge, MA (US); Hendrik van den Broek, Lexington, MA (US); Blake Sullivan, Redwood City, CA (US); Max Starets, Lexington, MA (US); Chadwick Chow, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 8 days.

(21) Appl. No.: 17/582,982

(22) Filed: Jan. 24, 2022

(65) Prior Publication Data

US 2022/0147701 A1 May 12, 2022

Related U.S. Application Data

(60) Division of application No. 16/917,627, filed on Jun. 30, 2020, now Pat. No. 11,347,935, which is a continuation of application No. 16/213,260, filed on Dec. 7, 2018, now Pat. No. 10,762,290, which is a continuation of application No. 15/247,857, filed on Aug. 25, 2016, now Pat. No. 10,229,103.

(51) Int. Cl.
*G06F 40/18* (2020.01)
*G06F 40/103* (2020.01)

(52) U.S. Cl.
CPC ............ *G06F 40/18* (2020.01); *G06F 40/103* (2020.01)

(58) Field of Classification Search
None
See application file for complete search history.

(56) References Cited

U.S. PATENT DOCUMENTS

| | | | | |
|---|---|---|---|---|
| 7,631,272 | B2* | 12/2009 | Bodgan | G06F 3/04892 715/767 |
| 7,735,023 | B1* | 6/2010 | Chadzelek | G06F 3/0489 715/767 |
| 10,318,625 | B2 | 6/2019 | Guggilla | |
| 2004/0240735 | A1* | 12/2004 | Medina | G06V 30/413 382/173 |
| 2005/0005243 | A1 | 1/2005 | Olander | |

(Continued)

OTHER PUBLICATIONS

In Design, In Design Help I Table and cell styles, Adobe, Retrieved: Mar. 27, 2014 (Year: 2014).

*Primary Examiner* — Howard Cortes
(74) *Attorney, Agent, or Firm* — Trellis IP Law Group, PC

(57) ABSTRACT

A method creates a data grid component in a GUI. The data grid includes data cells, header cells, corner cells, and may further include footer cells. The data grid component may have headers or footers that contain a scale and/or a ruler that relates to graphs shown in a row or column associated with the header or footer. The scale and/or ruler may be horizontal or vertical.
The GUI component may allow for multilevel navigation. One level allows for navigating from component to component in the GUI, including the data grid and any other components. Another level allows for navigating within a component, including in the data grid. Available user navigation inputs include level change commands, for example tied to specific keys.

6 Claims, 7 Drawing Sheets

(56) References Cited

U.S. PATENT DOCUMENTS

| | | |
|---|---|---|
| 2005/0198201 A1 | 9/2005 | Bohn |
| 2006/0015804 A1 | 1/2006 | Barton |
| 2006/0015846 A1 | 1/2006 | Fraleigh |
| 2006/0136807 A1* | 6/2006 | Yalovsky ............... G06F 40/177 715/256 |
| 2007/0061714 A1 | 3/2007 | Stuple et al. |
| 2007/0113205 A1* | 5/2007 | Bogdan ............... G06F 3/04892 715/825 |
| 2007/0157081 A1 | 7/2007 | Hara |
| 2007/0157082 A1 | 7/2007 | Green |
| 2008/0005658 A1 | 1/2008 | Benhase |
| 2010/0083081 A1 | 4/2010 | Rapp |
| 2011/0289447 A1* | 11/2011 | Kawaguti ............. G06F 3/0481 715/780 |
| 2012/0072867 A1* | 3/2012 | Schlegel ............... G06F 3/0482 715/808 |
| 2012/0159365 A1* | 6/2012 | Cragun .................. G06F 9/451 715/767 |
| 2012/0233312 A1 | 9/2012 | Ramakumar |
| 2013/0139109 A1 | 5/2013 | Kim |
| 2013/0167080 A1 | 6/2013 | Ari |
| 2013/0262974 A1 | 10/2013 | Anstis |
| 2014/0040724 A1 | 2/2014 | Krueger |
| 2014/0245205 A1* | 8/2014 | Smith ..................... G06F 16/51 715/767 |
| 2015/0051929 A1* | 2/2015 | Ranz ...................... G06Q 10/00 705/7.11 |
| 2015/0269747 A1 | 9/2015 | Hogan |
| 2016/0041698 A1 | 2/2016 | Tkach |
| 2016/0077686 A1 | 3/2016 | Cosio |
| 2017/0147173 A1 | 5/2017 | Schmidt |
| 2017/0235446 A1 | 8/2017 | Stolte |

\* cited by examiner

|  | Sales 2017 * $1k | | | | Forecast 2018 * $ | | | | |
|---|---|---|---|---|---|---|---|---|---|
|  | Q1 | Q2 | Q3 | Q4 | Q1 | Q2 | Q3 | | |
| Men | 14.5 | 18.9 | 17.4 | 36.3 | 16.0 | 20.7 | 19.1 | Men | |
| Ladies | 35.8 | 46.5 | 43.0 | 89.5 | 39.4 | 51.2 | 47.3 | Ladies | |
| Kids | 2.7 | 3.5 | 3.2 | 6.8 | 3.0 | 3.9 | 3.6 | Kids | |
| Work | 9.1 | 11.8 | 10.9 | 11.4 | 10.0 | 13.0 | 12.0 | Work | |
| Outdoor | 3.1 | 8.5 | 3.7 | 1.6 | 3.4 | 9.3 | 4.1 | Outdoor | |
| Sports | 10.2 | 19.9 | 12.2 | 12.8 | 11.2 | 21.9 | 13.5 | Sports | |
| Winter | 1.6 | 0.0 | 0.2 | 4.0 | 1.8 | 0.0 | 0.2 | Winter | |
| TOTAL | 77.0 | 109.1 | 90.7 | 162.2 | 84.7 | 120.0 | 99.7 | TOTAL | |

Fig. 5

EXTENDED DATA GRID COMPONENTS WITH MULTI-LEVEL NAVIGATION

CROSS REFERENCES TO RELATED APPLICATIONS

This application is a divisional of the co-pending U.S. patent application Ser. No. 16/917,627, filed Jun. 30, 2020, which is hereby incorporated by reference as if set forth in full in this application for all purposes, which is a continuation of U.S. Pat. No. 10,762,290 issued on Sep. 1, 2020, entitled DATA GRID COMPONENTS, which is a continuation of U.S. Pat. No. 10,229,103 issued on Mar. 12, 2019, which are all incorporated by reference as if set forth in full in this application for all purposes.

BACKGROUND

The disclosed technology is in the area of computer graphical user interfaces (GUIs). It can be used in applications that display tabular data in a scrollable grid, allowing user interaction to update the tabular data. Implementations include methods to display and interact with tabular data, tangible non-transitory media including such methods, and computer systems executing such methods.

GUI developer uses software components (software components are also called controls or widgets) to build a GUI for a software application. One of the most basic software components is a window, a rectangular area that has a width and a height, a position on the computer screen, and one or more rendering properties, such as a color. A window can contain other software components, but it can also be used as the basis for a more complex software component, such as a button, a text field, a dropdown box, a menu, a scrollbar, etc.

Data grids are software components used to display tabular data, often in a text form. The tabular data may be presented in an X-direction (a row), in a Y-direction (a column), and a Z-direction—usually in the form of multiple tabs, each containing a field containing rows and columns. Typically, rows are preceded by a row header identifying the row location and columns are preceded by a column header identifying the column location. For example, Microsoft Excel displays worksheets (data grids) in which row headers show row numbers (1 . . . 1,048,576), and column headers show column letter combinations (A . . . XFD).

Conventional data grids are primarily directed towards displaying text and numbers. However, advanced data grids, including those used in Microsoft Excel, OpenOffice Calc, LibreOffice Calc and those available in GUI development environments such as NetBeans, Qt, etc., have many more capabilities, including formatting of text fonts, rendering backgrounds of individual cells or cell ranges, overlaying the data grid with bitmaps, vector-based graphics or other objects, populating an individual cell with a widget such as a dropdown box, and even populating an individual cell with a graph. Navigation can be an issue. For example, using the Tab and arrow keys, an Excel user can either navigate the functions in the ribbon, or navigate the cells of a data grid, or navigate objects overlaying the data grid. Use of the Alt and ESC keys allows some means of switching between different types of navigation, but no simple intuitive way is provided to navigate from a cell to an object overlaying a worksheet using just a keyboard.

Implementations address issues including rendering performance, navigation, cell style, and provide header innovation.

SUMMARY

Implementations include methods to display and interact with tabular data in a scrollable grid and to create software capable thereof, tangible non-transitory media including such methods, and computer systems executing such methods. The simplest way to present and interact with the tabular data is in the form of text. The tabular data may be presented in at least a first direction, but is most often arranged in an X-direction (a row) and a Y-direction (a column). A computer graphical user interface (GUI) developer uses software components (software components are also called controls or widgets) to build a GUI for a software application. Data grids are software components to display and interact with tabular data on a computer screen.

Implementations provide greater utility to both GUI developers and end users by addressing issues including rendering performance, navigation, cell style, and providing header innovation.

Implementations provide a method for navigation of a GUI with multiple software components, including a data grid. The method has the following steps: (710) within the GUI, selecting an initial navigation level and selecting a first of the multiple software components; (720) receiving a user navigation input; (730) determining if the received user navigation input includes a level change command; (740) if it includes a level change command, changing the navigation level; and (750) if it does not include a level change command, navigating within the level based on the received user navigation input. A first navigation level allows for navigating among the multiple software components and a second navigation level allows for navigating within a selected one of the multiple software components. A third navigation level allows for navigating within a cell in the data grid. A first level change command is associated with a first keyboard key and a second level change command is associated with a second keyboard key.

A further understanding of the nature and the advantages of particular implementations disclosed herein may be realized by reference of the remaining portions of the specification and the attached drawings.

BRIEF DESCRIPTION OF THE DRAWINGS

The technology will be described with reference to the drawings, in which:

FIG. 1 illustrates a conventional basic data grid example;
FIG. 2 illustrates another conventional data grid example;
FIG. 5 illustrates a data grid with multi-level headers and footers.

DETAILED DESCRIPTION

Figures 3, 4:
FIG. 3 illustrates a data grid with header styles and data cell styles.
FIG. 4 illustrates a data grid with a header and a data cell containing objects.

Implementations include methods to display and interact with tabular data in a scrollable grid and to create software capable thereof, tangible non-transitory media including such methods, and computer systems executing such methods. The simplest way to present and interact with the tabular data is in the form of text. The tabular data may be presented in at least a first direction, but is most often arranged in an X-direction (a row) and a Y-direction (a column). A computer graphical user interface (GUI) developer uses software components (software components are also called controls or widgets) to build a GUI for a software application. Data grids are software components to display and interact with tabular data on a computer screen.

Implementations provide greater utility to both GUI developers and end users by addressing issues including rendering performance, navigation, cell style, and providing header innovation.

Figures 1, 2:
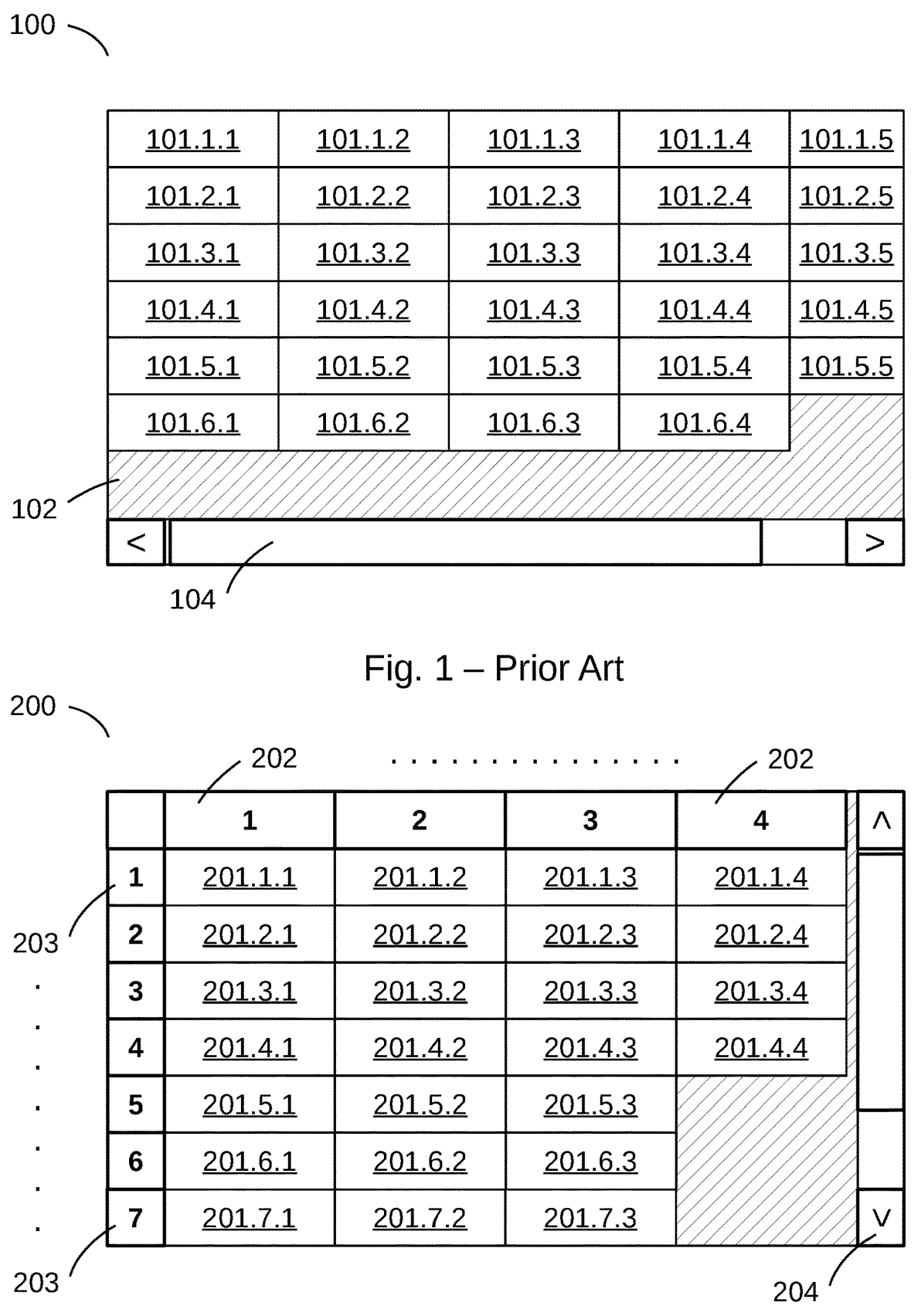

FIG. 1 illustrates a conventional basic data grid example 100. Data grid 100 includes window 102, which acts as overall container of the software component, and which may act as a background canvas. Window 102 includes data cells 101.1.1 through 101.6.4, here arranged in 6 rows and five columns. A first row includes data cells 101.1.1 ... 101.1.5, etc., and a first column includes data cells 101.1.1 ... 101.6.1. Data cells in the fifth column (101.1.5 ... 101.5.5) are only partially displayed. Horizontal scrollbar 104 allows a user to scroll horizontally. Conventional data grids may offer a predetermined number of data cells, arranged in a fixed order of rows and columns, or a GUI developer or the application in which a data grid is used may determine the number of data cells, rows, and columns. Example data grid 100 includes 29 data cells, showing that not all rows or columns need to have the same number of data cells. Data cells typically span one row and one column. However, many conventional data grids allow data cells to span multiple adjacent rows and/or columns. Therefore, a data grid that includes six rows and five columns may have any number of data cells from 0 to 30. Each data cell (a data structure) typically includes a rectangular window (the data cell window). The data structure represents cell data and may contain aspects of the cell data itself as well as contextual information of its visual presentation and the types of user interaction that are permitted. The data cell window may display parts or all of the cell data, for example in the form of a text or a number. To display cell data or interact with the cell data, a cell window may also include another software component. For example, when a user wants to change cell data that is limited to specific values in a list, the cell window may include a dropdown box software component to show permitted list values. When the user picks a new value, the cell data is changed to the new value.

FIG. 2 illustrates another conventional data grid example 200. Data grid 200 includes a grid of more than seven rows, and four columns. Only seven rows are shown, and vertical scrollbar 204 allows a user to scroll to the remaining rows. Data grid 200 shows 25 data cells, items 201.1.1 through 201.7.3. It additionally shows column headers 202 and row headers 203. When a user scrolls vertically, with vertical scrollbar 204, column headers 202 remain in place whereas the data cells move vertically in accordance with vertical scrollbar 204. Row headers 203 scroll along with the data cells. When a user scrolls horizontally, using a horizontal scrollbar (not shown), row headers 203 remain in place whereas column headers 202 and the data cells move horizontally in accordance with the horizontal scrollbar. Data grids typically distinguish headers from data cells by using a different visual style or formatting. For example, headers in data grid 200 have thicker boundary lines and a bold typeface.

FIG. 3 illustrates a data grid 300 with header styles and data cell styles. Data grid 300 includes data cells 301.1.1-301.7.3, column headers 302.1-302.4, and row headers 303.1-303.7. Whereas data cells in conventional data grids need to each be initialized with various elements of the visual appearance, implementations may include data cells and/or header cells whose visual appearance is at least partially determined by one or more templates. Implementations may capture one or more styles each in a template, and headers or data cells may refer to a style, or a combination of styles, to determine their visual appearance. Additionally, they may carry individual style information that may at least partially replace or complement the template-based style information.

FIG. 3 shows column headers 302.1 and 302.4 in a first header style, and column headers 302.2 and 302.3 in a second header style. It shows row headers 303.1, 303.2, 303.4, 303.6 and 303.7 in the first header style, and row headers 303.3 and 303.5 in a third header style. In this example, the different styles are illustrated by different background rendering of the headers. FIG. 3 further shows most data cells in a first data cell style (with white background), whereas data cells 301.3.2 and 301.3.3 are shown in a second data cell style, and data cells 301.5.2 and 301.5.3 are shown in a third data cell style.

Implementations may define a data grid in any of a large variety of programming languages and data formats. For example, some GUI developers may prefer to work in a compiled language, such as Java or C++, and other GUI developers may prefer to work in a script language, such as JavaScript or Python. Similarly, software components may be compiled, or interpreted. They may be used from a pre-compiled library, or they may be borrowed from a non-operating system dependent GUI technology, such as hypertext markup language (HTML). The latter is very convenient for defining styles. For example, an implementation may use a data cell or a header as a <DIV> element. The format of an individual DIV element may directly be programmed in one or more style statements. The style for multiple DIV elements may be programmed as a class (a style template not to be confused with a software class as used elsewhere in this document), which may be defined in a cascading style sheet (CSS file). An implementation can change all data cells and/or headers in a class simultaneously by modifying the class definition, and it can change all data cells and/or headers in multiple classes simultaneously by replacing a CSS file.

FIG. 4 illustrates a data grid 400 with a header 402.3 and a data cell 401.3.1 containing objects. Data grid 400 includes data cells 401.1.1-401.7.3. Data cell 401.3.1 includes a bitmap. In one implementation, the data cell window may contain a software component (an object) that is optimized for display of bitmaps, for example an <IMG> element in an HTML system or a graphics view widget in any GUI development environment. In another implementation, the bitmap may be directly painted onto the data cell window, for example a <DIV> element in HTML. In a further implementation, the bitmap may be directly painted onto the data cell window as the result of usage of a class or style template, as discussed above with reference to FIG. 3.

Column header 402.3 includes a date picker software component. The date picker shows a date (May 31, 2016) including a month, a day, and a year, and including controls to spin each of these up or down. Software developers use date pickers, and similar software components, to allow a user to enter valid data only. In other words, whereas editing a date in the form of text would allow a user to enter an invalid date, a date picker would only accept valid dates. Conventional data grids do not allow users to edit or modify headers and may not allow developers to fill data cells or headers with objects, such as a software component.

In implementations, data cells may be configured to include text captions and/or software components, for example configured to show and interact with a date, a time, a graph, a chart, a bitmap, streaming graphics, and a streaming bitmap. Display data may be received and/or retrieved from one or more of a software program, a database, a data file, and a data stream.

Additionally, implementations may offer improved rendering performance by tying a data entry object to a data cell only once a user clicks on the data cell to start editing the data contained in it. In this manner, when a data grid includes a large range of data cells whose input data must be validated by a software component, only the data cell being edited is burdened with the computational complexity of the software component (object).

FIG. 5 illustrates a data grid 500 with multi-level headers and footers. Data grid 500 includes a column of row headers 503 and a column of row footers 504. It further includes a row of multi-level column headers 506 and a row of column footers 507. Corner cells on the crossing of header/footer rows and header/footer columns include bottom left corner cell 508 and bottom right corner cell 509.

In the implementation, row footers, like row headers, do not respond to a user's horizontal scroll inputs, but they move vertically along with data cells in response to the user's vertical scroll inputs. Similarly, column footers in the implementation do not respond to the user's vertical scroll inputs, but they move horizontally along with data cells in response to the user's horizontal scroll inputs. In some implementations, footers may have the same style as headers, or the same style as their corresponding headers, or they may have a different style, or footers or ranges of footers may have individual styles and/or styles based on one or more templates. In further implementations, individual footer style values may override template footer style values. In the example data grid 500, column footers in column footer row 507, as well as corner cells 508 and 509, feature a different background rendering than multi-level column headers 506.

In some implementations, headers and/or footers may display text captions, rather than the coordinates of conventional data grids. Footer text captions may be the same as header text captions. For example, row footers 504 display the same captions as row headers 503 ("Men", "Ladies", etc.). Footer text captions may be different than header text captions. For example, column footers 507 display very different captions (77.0, 109.1, etc.) than the corresponding column headers 506 ("Sales 2017*$1 k", "Q1", etc.). Footers may include objects, including software components, graphics views, and any other objects with a visual aspect. In an implementation, a footer may include a software component configured to show and interact with one or more of a text, a date, a time, a graph, a chart, a bitmap, streaming graphics, and a streaming bitmap; and wherein display data is received or retrieved from one or more of a software program, a database, a data file, and a data stream.

Row 506 shows an example implementation of multi-level column headers. Row 506 includes two levels: a basic level with granularity equal to the granularity of data cell columns (containing captions "Q1", "Q2", etc.), and a higher level spanning several data cell columns (with captions "Sales 2017*$1 k" and "Forecast 2018*$ . . . "). Whereas example 500 shows multi-level column headers, further implementations may include multi-level column footers, multi-level row headers, and/or multi-level row footers. Whether headers or footers, or parts thereof, span single rows/columns or multiple rows/columns, each may have an individual style or a template-based style; each may have an individual text caption; and each may include objects, including software components, graphics views, and any other objects with a visual aspect. Multi-level headers and footers may have any depth, i.e., any number of levels, and any extent, i.e., they may span any number of rows or columns. Multi-level headers may have a hierarchical structure, which may be driven by a data source.

Implementations may further include corner cells, of which each may have an individual style or a template-based style; each may have an individual text caption; and each may include objects, including software components, graphics views, and any other objects with a visual aspect. In an implementation, a corner cell may include a software component configured to show and interact with one or more of a text, a date, a time, a graph, a chart, a bitmap, streaming graphics, and a streaming bitmap; and wherein display data is received or retrieved from one or more of a software program, a database, a data file, and a data stream. Example corner cells 508 and 509 are simple, with a style that matches the style of footer row 507, and equal text captions ("TOTAL"). Corner cells do not respond to any user scroll inputs. In implementations, individual corner cell style values may override template corner cell style values.

Further implementations may include high-watermark scrolling to avoid the need for a data grid to show a vertical scrollbar in mobile applications. High-watermark scrolling is a scroll policy that adds a set number of rows to the overall data grid height when explicitly requested by a user. This scroll policy is most appropriate when no other page content exists beneath the data grid and the data grid content is also the prevailing page content. In case there is more data to be shown, the implementation shows a button, icon, or link, for example on the bottom right of the table, that a user can tap or click to show an additional page of entries or to load more data. A data grid implementation may implement its data structure in a Document Object Model (DOM) as a data hierarchy. If the implementation includes high-watermark scrolling, it may keep a first page DOM in local memory as it loads a second page or it may keep existing DOM elements in local memory as it loads more data.

Yet further implementations that implement a DOM may include virtual scrolling. In virtual scrolling, an implementation keeps the content of local memory as small as possible by removing DOM elements outside of a data grid's view port from local memory.

Figure 6:
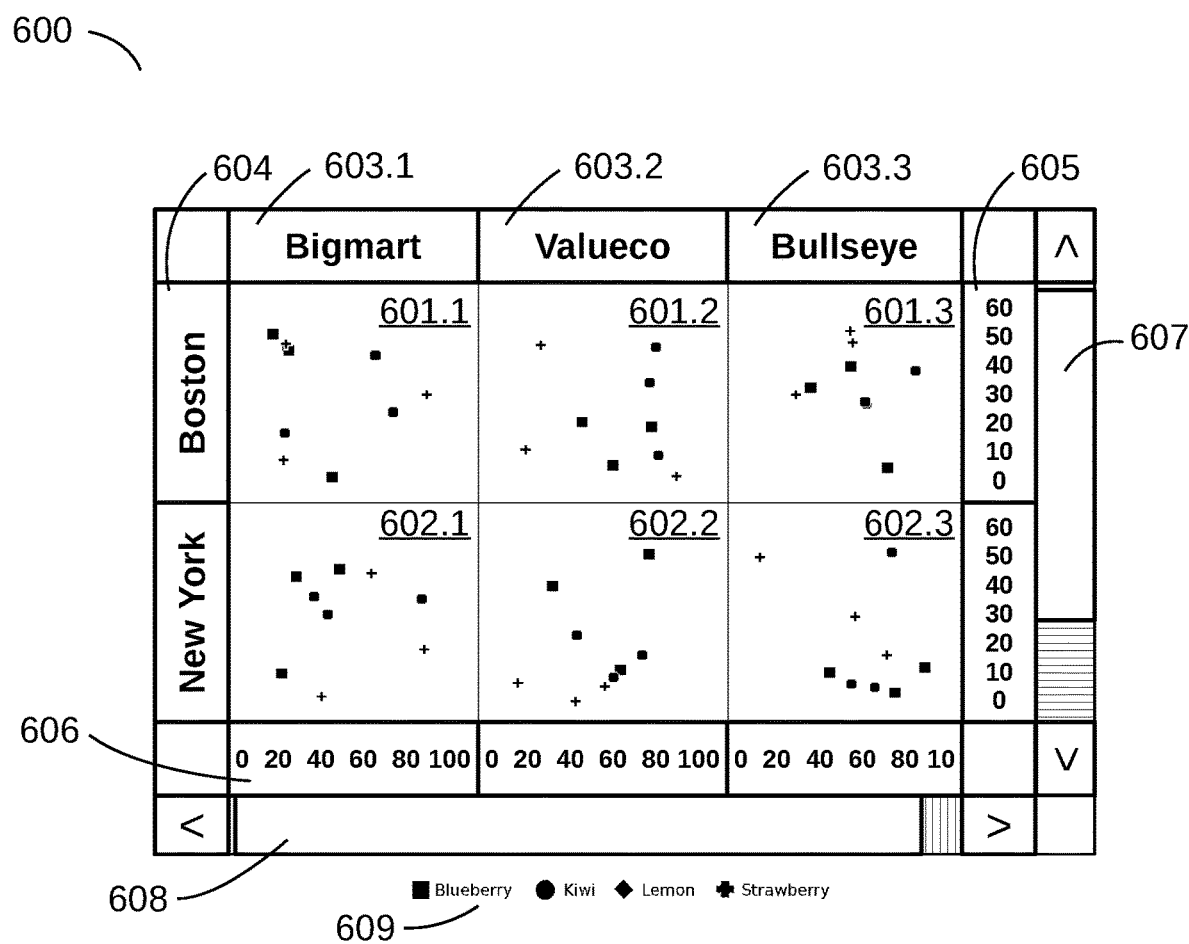
FIG. 6 illustrates a data grid with graphs, and footers showing data scales for the graphs.

FIG. 6 illustrates a data grid 600 with graphs, and footers showing data scales for the graphs. Data grid 600 includes data cells 601.1-602.3, column headers 603.1-603.3, row headers 604, row footers 605, column footers 606, vertical scroll bar 607, horizontal scroll bar 608, and data comments panel 609.

Data cells 601.1-602.3 each display a graph. As has been mentioned with respect to FIG. 4, some implementations may paint a graph directly onto a data cell window, whereas in other implementations a data cell window may include another object, for example a graphics view software component or a widget optimized for displaying graphs. The graphs in data grid 600 may be based on sets of data items that the implementation retrieves from or receives from a database, data file, or data stream, whereas in yet other implementations graphs may simply have been frozen in bitmaps. As data comments panel 609 suggests, the graphs compare sales of blueberries, kiwis, lemons, and strawberries in big box stores (column headers 603.1-603.3) in Boston and New York (row headers 604). Column footers 606 show a horizontal scale for the graphs (0-100) and row footers 605 show a vertical scale for the graphs (0-60). Some implementations may provide the scale as a bitmap. Other implementations, that allow an end user to resize the data grid, may dynamically generate the scales as they paint the footers on the screen. Besides scale values, some implementations may display rulers in footers (or headers, as the case may be), or other elements that are meaningful for an end user to interpret the graphs.

Data grid 600 further shows that text elements need not be horizontal. The texts in row headers 604 are vertical, i.e., they have been rotated 90 degrees counter-clockwise. Implementations may display text in data cells, headers, footers, and/or corner cells rotated any number of degrees.

Figure 7:
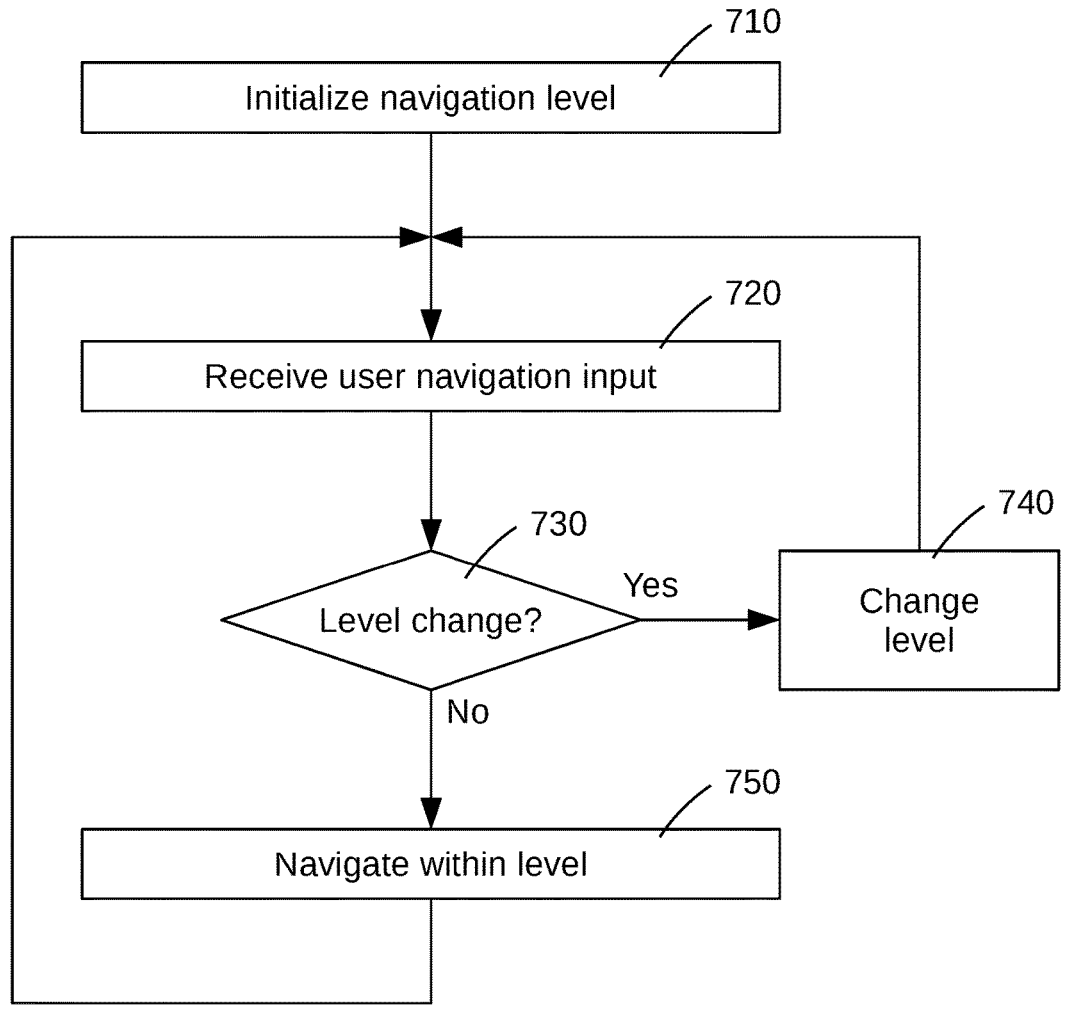
FIG. 7 illustrates a method for navigating a GUI with a data grid.

FIG. 7 illustrates a method 700 for navigating a GUI with a data grid. The method is based on the notion that two or more levels of navigation may exist. The first (and highest) level is navigation within the GUI, where a user may navigate from software component to software component using, for example, the Tab, Shift+Tab, Page Up, Page Down, Home, End, and/or arrow keys. Normally, applications let a user navigate within a tab order sequence of the software components, where the Tab key will navigate to a next software component in the sequence, and Shift+Tab will navigate to a previous software component. The next (second) level is navigation within a selected software component. A common-sense solution would be to limit Tab and Shift+Tab to the highest level of navigation and to use other keys for navigation within the software components. However, within a data grid this is a problem since many users are familiar with Microsoft Excel which uses the Tab and Shift+Tab keys to navigate within a worksheet. Further, in a data grid it must be possible to navigate within a software component that is included in a data cell, or to navigate within a data cell text that is being edited. This introduces at least a third level of navigation. Implementations assign two navigation level change keys. For example, the F2 key enables a user to change to a lower level of navigation, and the ESC key enables a user to change to a higher level of navigation. Method 700 includes the following steps.

Step 710—the implementation initializes the navigation level and initially selected software component. For example, navigation might be initialized at the highest level, and a software component location in the top left corner of an application main window. Or, navigation might be initialized at the second level where the initially selected software component is a data grid. Within the data grid, the implementation defines a first selected data cell, for example the top left cell.

Step 720—receiving a user navigation input. The user navigation input may include "level up", "level down", "next item", "previous item", "item up", "item down", etc., as per the assigned keys, such as ESC, F2, Tab or right arrow, Shift+Tab or left arrow, up arrow, down arrow, etc. Because of the widespread use of spreadsheets, users are familiar with several more keys and key combinations that facilitate navigation within a data grid and that feel intuitive. All such keys and key combinations are within the ambit and scope of the disclosed technology.

Step 730—determining if the received user navigation input includes a level change command (level up, or level down).

Step 740—upon determining that the received user navigation input includes a level change command, changing the navigation level and returning to step 720.

Step 750—navigating within the level based on the received user navigation input, and returning to step 720. For example, when the received user navigation input includes the command "next item" (for example from the Tab or the right arrow key) and navigation is set at the first level, the implementation will select a next software component in the tab order. But if navigation is set at the second level, and the selected software component is a data grid, then the implementation will select a next data cell within the data grid. If navigation is set at a third level, the implementation may select a next character within a data cell, or may select a next item within a software component contained in a data cell.

Method 700 focuses on user inputs via a keyboard. GUIs support many more types of user inputs (including via a mouse, stylus, screen gestures, voice controls, eye controls, etc.) as well as different keyboard inputs such as Ctrl+<key> or Alt+<key>, where the user inputs may contain complex navigation commands, such as the command to navigate to a specific software component and change navigation level if needed. Support for complex commands is merely an extension of method 700, which remains intact for implementations.

Figure 8:
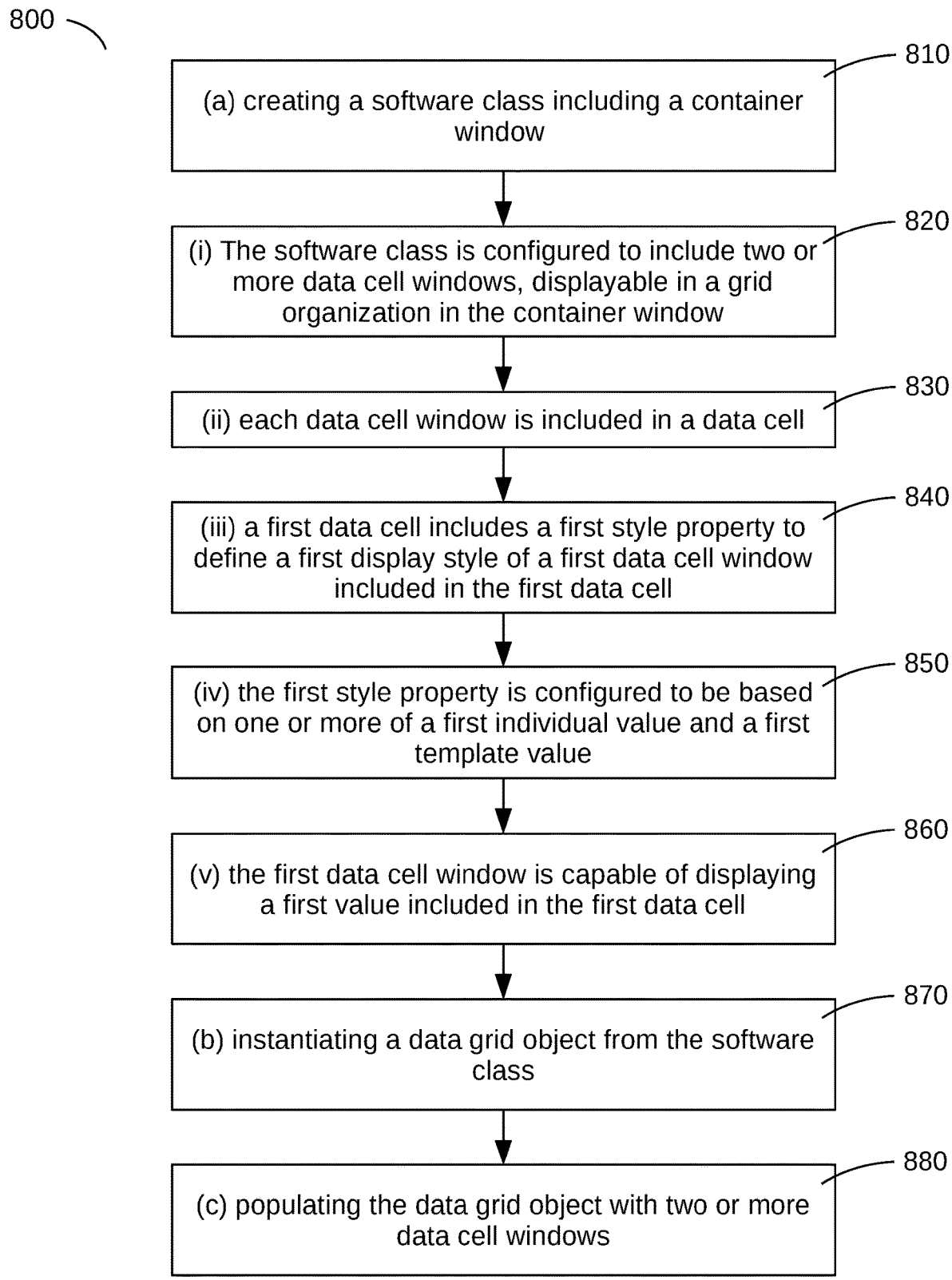
FIG. 8 illustrates a method for creating a data grid software component.

FIG. 8 illustrates a method 800 for creating a data grid software component. The data grid is for use in a GUI to interact with and visually display data on a computer screen. Method 800 includes the following steps and limitations.

Step 810—creating a software class including a container window. A software class constitutes a software template for an object that may contain functions and properties. Functions and properties may be either public or private. Public functions are mostly used to interface with the class's properties, but they may also be used to act on external variables. Properties, whether public or private, may be as simple as variables, or as complex as other objects and software components, or pointers or references thereto.

Limitation 820—the software class is configured to include two or more data cell windows, displayable in a grid organization in the container window. The grid organization may be in one or more dimensions. Most typically, data cell windows are organized in rows and columns to represent the values included in two-dimensional data tables. However, a data grid may also represent a one-dimensional table (a simple list), a three-dimensional table (multiple pages of two-dimensional tables, a four-dimensional table (multiple books of three-dimensional tables), etc. A data cell window may be as simple as a uniform rectangle to represent empty data, or a text label to represent text or numeric data, or the data cell window may be a container window of another software component, for example one for entering, selecting, or editing textual data, or one for displaying and interacting with complex graphical data.

Limitation 830—each data cell window is included in a data cell. A data cell may be a data structure that includes the data to be displayed, contextual information about the data and the way it is displayed, and the data cell window. It may also include information about how the user may interact with the data, for example whether it is locked or unlocked, the types of data allowed, and whether invalid data is rejected.

Limitation 840—a first data cell includes a first style property to define a first display style of a first data cell window included in the first data cell. The style property may impact many aspects of displaying the data, including background color, foreground color, typeface, font effects, font size, positioning, alignment, and any other type of formatting that is common in the art.

Limitation 850—the first style property is configured to be based on one or more of a first individual value and a first template value. The first template may be an external template, prescribing part or all of the aspects of displaying the data, or it may be an internal template that can be selected to replace part or all of the aspects of displaying the data that may come with the class implementation's default values. The first style property may include some element values from the first template, whereas others are overwritten or overridden by individual element values.

Limitation 860—the first data cell window is capable of displaying a first data value included in the first data cell. Implementations may receive or retrieve the first data from a database, a data file, or a data stream. Implementations may decode, demodulate, decrypt, process, combine, or manipulate the first data prior to displaying.

Step 870—instantiating a data grid object from the software class. Whereas the software class provides a template, implementations instantiate an actual data grid software component from the software class for using it in a GUI.

Step 880—populating the data grid object with two or more data cell windows to show at least two data values and displaying the data grid object in the GUI. Populating the data grid enables it to receive or retrieve data for its data cell windows and to display the data to a user, and to receive user inputs to modify the data.

In implementations, the software class may further comprise a footer configured to include one or more of a text label and another software component. In further implementations, the software class comprises a corner cell configured to include one or more of a text label and another software component. In yet further implementations, the software class further comprises a header configured to include another software component.

In some implementations, the software class further comprises a multi-level header, or a multi-level footer. A multi-level header may include a first level with granularity equal to the granularity of data cell columns or rows, as well as a second and further levels spanning multiple columns or rows. Whether headers or footers, or parts thereof, span single rows/columns or multiple rows/columns, each may have an individual style and/or a template based style, each may have an individual text caption, and each may include objects, including software components, graphics views, and any other objects with a visual aspect.

In implementations, a data cell may be configured to include one or more of a text label and another software component. The data grid object may include a third data cell window adapted for displaying a graph. And the third data cell window may be adapted for displaying a graph capable of showing data received or retrieved from a database.

Figure 9:
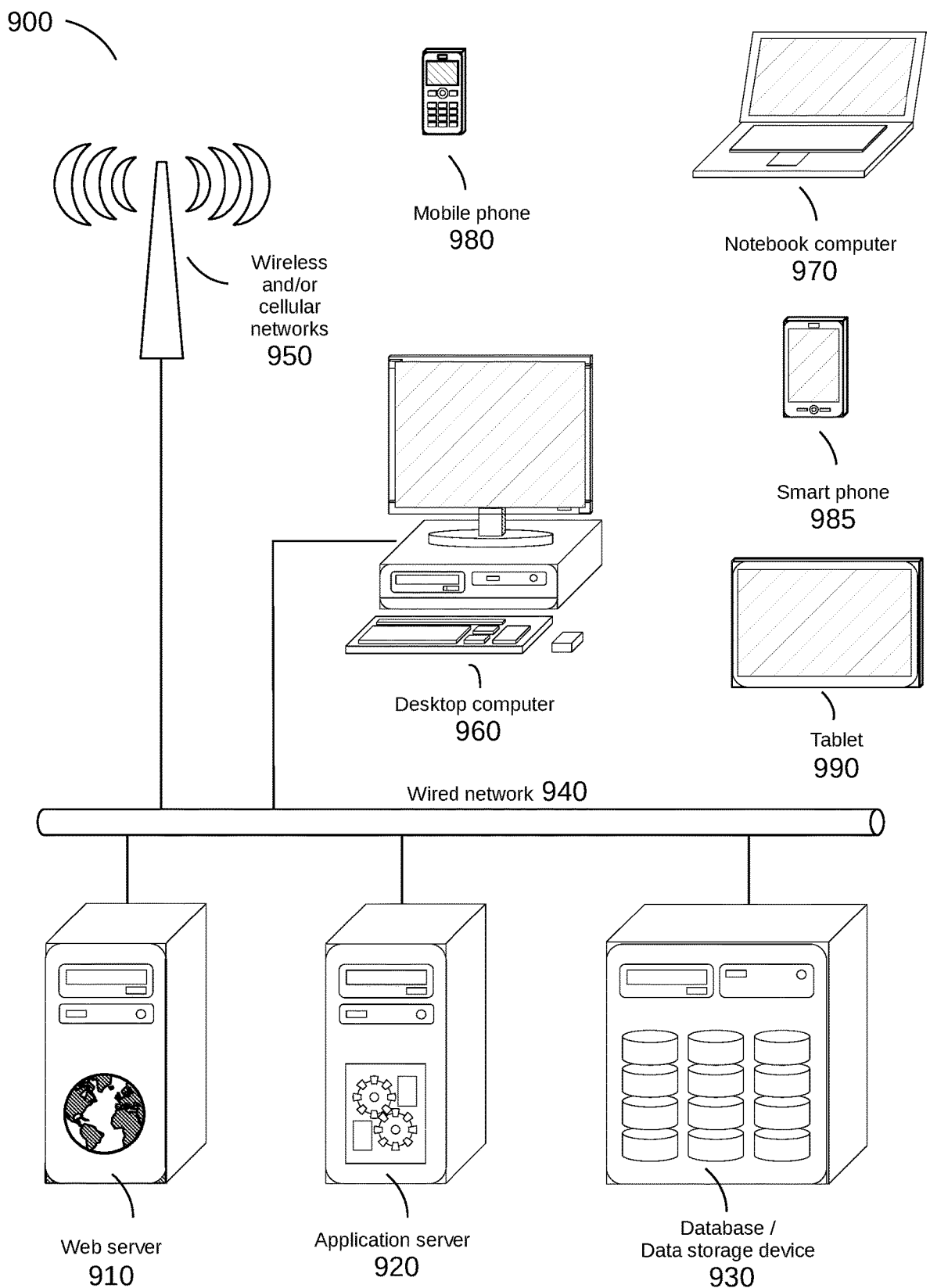
FIG. 9 illustrates an example system capable of implementing data grid software components.

FIG. 9 illustrates a system suitable for implementing data grid software components. FIG. 9 shows an example computer and network system architecture 900 suitable for implementing implementations. The system includes the following user computers, which may be client computers including a GUI: desktop computer 960, notebook computer 970, mobile phone 980, smart phone 985, and tablet 990. The system can interface with any type of electronic device, such as a thin-client computer, internet-enabled mobile telephone, mobile internet access device, tablet, electronic book, or personal digital assistant, capable of displaying and navigating web pages or other types of electronic documents. Although the system is shown with five user computers, any number of user computers can be supported. User computers 960-690 and other electronic devices can act as client systems using host servers included in system 900.

A web server 910 is used to process requests from web browsers and standalone applications for web pages, electronic documents, enterprise data or other content, and other data from the user computers. Web server 910 may also provide a menu application, as well as syndicated content, such as RSS or Atom feeds, of data related to enterprise operations.

Application server 920 operates one or more mobile applications. The mobile applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails, Enterprise JavaBeans, or .NET.

The data applications on application server 920 process input data and user computer requests and can store or retrieve data from database/data storage device 930. Database/data storage device 930 stores data created and used by the data applications. In an implementation, the database/data storage device 930 includes a relational database, such as MySQL, that is adapted to store, update, and retrieve data in response to SQL format commands. In other implementations, unstructured data storage architectures and NoSQL databases may also be used.

In an implementation, application server 920 includes one or more general-purpose computers capable of executing programs or scripts. In an implementation, web server 910 is implemented as an application running on one or more general-purpose computers. The web server and application server may be combined and executed on the same computer(s).

An electronic communication network enables communication between user computers 960-990, web server 910, application server 920, and database/data storage device 930. In an implementation, the electronic communication network may further include any form of electrical or optical communication devices, including wired network 940 and wireless network 950. The electronic communication network may also incorporate one or more local-area networks, such as an Ethernet network; enterprise networks, wide-area networks, such as internet and cellular carrier data networks; and virtual networks, such as a virtual private network.

The system is one example for executing mobile applications. In another implementation, application server, web server, and optionally database can be combined into a single server computer application and system. In a further implementation, virtualization and virtual machine applications may be used to implement one or more of the application server, web server, and database. In still further implementations, all or a portion of the web server and application functions may be integrated into an application running on each of the user computers. For example, a JavaScript application on the user computer may be used to retrieve or analyze data and display portions of the applications.

Although the description has been described with respect to particular implementations thereof, these particular implementations are merely illustrative, and not restrictive.

For example, all figures depict two-dimensional tables, with a left-to-right and a top-to-bottom convention. Implementations support tables with any number of dimensions, with left-to-right or right-to-left convention, and with top-to-bottom or bottom-to-top convention. Styles of data cells, headers, footers, and corner cells are shown as limited to background hatching, font weight, and thickness of the cell border lines. However, implementations support any formatting options known in the art, including background color, background hatching, background shading, background gradients, border line colors and dashing, font, font style, font size, font effects, font position, font color (or foreground color), underlining, overlining, text alignment (horizontal and vertical), indentation, wrapping, text orientation, data type limitations, data value limitations, protection, and data hiding or data cell window hiding. Further, the example figures show static data, or data that can change upon user interaction. However, each of a data cell, a header, a footer, and a corner cell may have volatile data coming from an external data stream, or from an internal data generator such as a random number generator. All such variations are within the scope and ambit of implementations.

Any suitable programming language can be used to implement the routines of particular implementations including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a tangible, non-transitory computer-readable information storage medium for use by or in connection with the instruction execution system, apparatus, system, or device. Particular implementations can be implemented in the form of control logic in software or hardware or a combination of both. The control logic, when executed by one or more processors, may be operable to perform that which is described in particular implementations. For example, a tangible, non-transitory computer-readable information storage medium such as a hardware storage device can be used to store the control logic, which can include executable instructions.

Particular implementations may be implemented by using a programmed general-purpose digital computer, by using application specific integrated circuits, programmable logic devices, field programmable gate arrays, optical, chemical, biological, quantum or nano-engineered systems, components and mechanisms may be used. In general, the functions of particular implementations can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

We claim:

1. A method for navigating a graphical user interface (GUI) on a computer's screen, wherein the GUI includes multiple software components including a data grid including a plurality of cells, the method comprising:
    within the GUI, selecting a navigation level and selecting a first software component of the multiple software components;
    receiving a first user navigation input including activation of a first change key associated with a first level change command;
    in response to receiving the first user navigation input, selecting a lower navigation level from navigating outside of the plurality of cells to navigating items of a cell software component within a particular cell of the plurality of cells of the data grid, wherein the cell software component of the particular cell is configured to show and to interact with one or more items of a graph, bitmap, streaming graphic, or streaming bitmap;
    receiving a first user edit input to edit a select item of the one or more items of the cell software component; and
    in response to receiving a second user navigation input including activation of a second change key associated with a second level change command, selecting a higher navigation level, wherein when a current navigation level is within the particular cell, the second level change command includes a change from navigating within the particular cell of the plurality of cells of the data grid to navigating outside of the plurality of cells.

2. The method of claim 1, wherein the first user navigation input includes "level up", "level down", "next item", "previous item", "item up", and "item down".

3. The method of claim 1, wherein the first user navigation input and/or the second user navigation input are/is further supported from at least one of a keyboard, a mouse, a stylus, a screen gesture, a voice control, or an eye control.

4. The method of claim 1, wherein the cell software component of the particular cell is configured to show and to interact with a graph and the one or more items include one or more data items of the graph.

5. The method of claim 4, wherein the data grid further comprises at least one of a header or footer including one or more elements to interpret the graph.

6. The method of claim 5, wherein the one or more elements include one or more scales of the graph, wherein the method further comprises:
  receiving a second user edit input to resize the data grid; and
  dynamically generating the one or more scales in response to receiving the second user edit input.

* * * * *